United States Patent [19]

Fasse et al.

[11] 4,406,232
[45] Sep. 27, 1983

[54] AUTOMATIC GUIDANCE MECHANISM STEERING CLUTCH

[75] Inventors: Mark E. Fasse, Lexington; Herbert C. Glesmann, Omaha, both of Nebr.

[73] Assignee: Pathfinder Systems, Inc., Lexington, Nebr.

[21] Appl. No.: 246,203

[22] Filed: Mar. 23, 1981

Related U.S. Application Data

[63] Continuation-in-part of Ser. No. 39,224, Mar. 21, 1977, abandoned.

[51] Int. Cl.³ .................. B61K 5/02; B61F 9/00; B62D 5/06; F61D 7/02
[52] U.S. Cl. .................. 104/244.1; 180/131; 403/108; 403/328; 464/41
[58] Field of Search .......... 104/244.1; 172/23, 26, 172/270; 180/79, 131; 292/252, 262, 275; 403/108, 109, 328, 329; 464/37, 38, 41

[56] References Cited

U.S. PATENT DOCUMENTS

| | | | |
|---|---|---|---|
| 2,429,091 | 10/1947 | Dodge et al. | 464/38 X |
| 3,175,769 | 3/1965 | Fischer | 180/79 X |
| 3,548,966 | 12/1970 | Blacket | 104/244.1 X |
| 3,581,838 | 6/1971 | Rhodes | 104/244.1 X |
| 3,635,304 | 1/1972 | Hills | 180/79 |
| 3,665,778 | 5/1972 | Bohan et al. | 403/329 X |
| 3,708,029 | 1/1973 | Sedgfield et al. | 104/244.1 X |
| 3,765,501 | 10/1973 | Burvee | 104/244.1 X |
| 3,844,372 | 10/1974 | Neece | 104/244.1 X |

FOREIGN PATENT DOCUMENTS 54-123684  9/1979  Japan .................. 180/131

*Primary Examiner*—Bruce H. Stoner, Jr.
*Assistant Examiner*—David F. Hubbuch
*Attorney, Agent, or Firm*—Henderson & Sturm

[57] ABSTRACT

A clutch mechanism for use in an automatic steering system is disclosed. The clutch mechanism allows an operator to manually override the automatic steering mechanism by use of the conventional steering gear. It also prevents damage to the automatic steering mechanism, which might be produced by large displacements in a steering gear feedback mechanism. Both angular and linear displacement dissipation devices are described.

6 Claims, 14 Drawing Figures

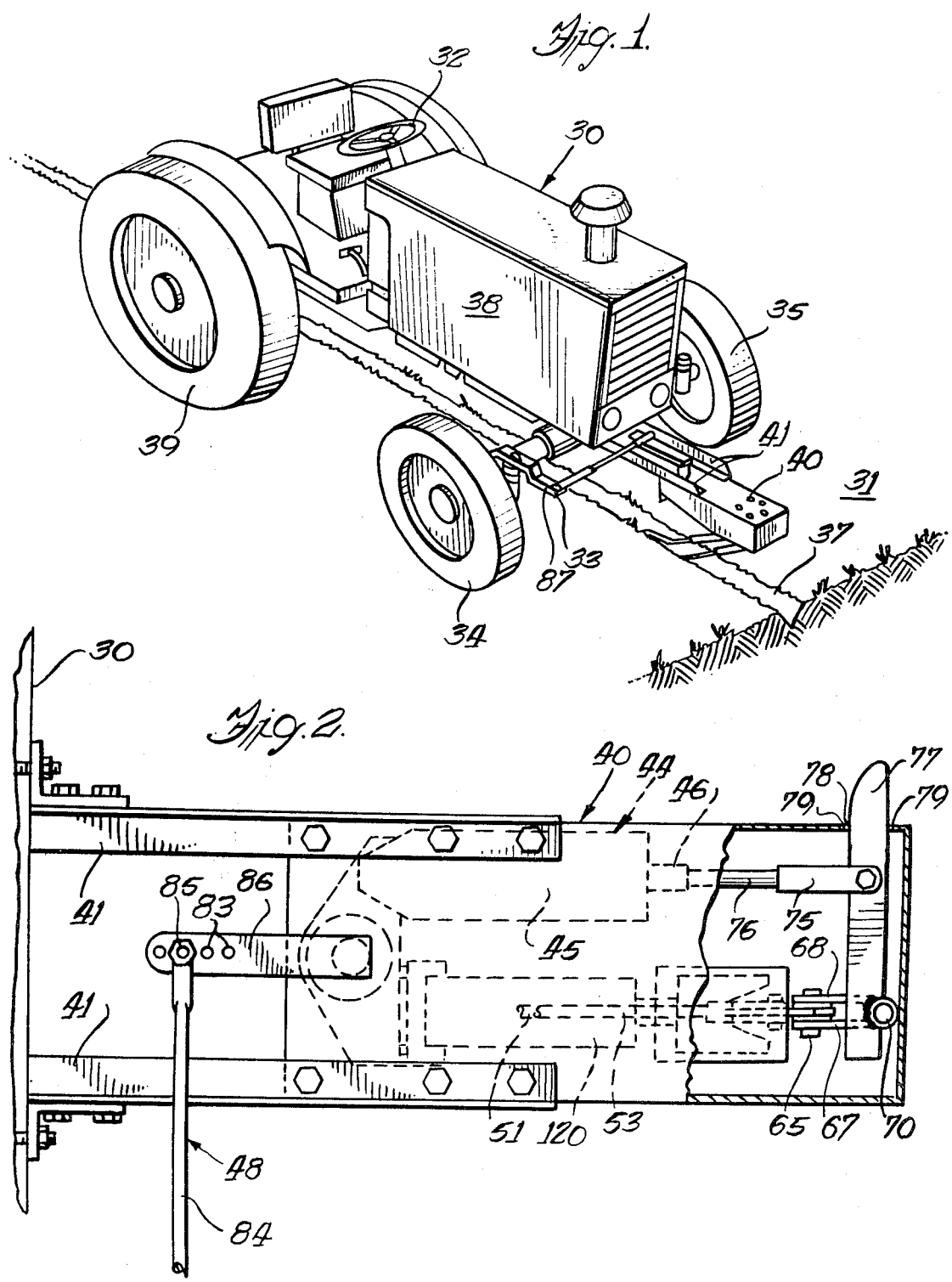

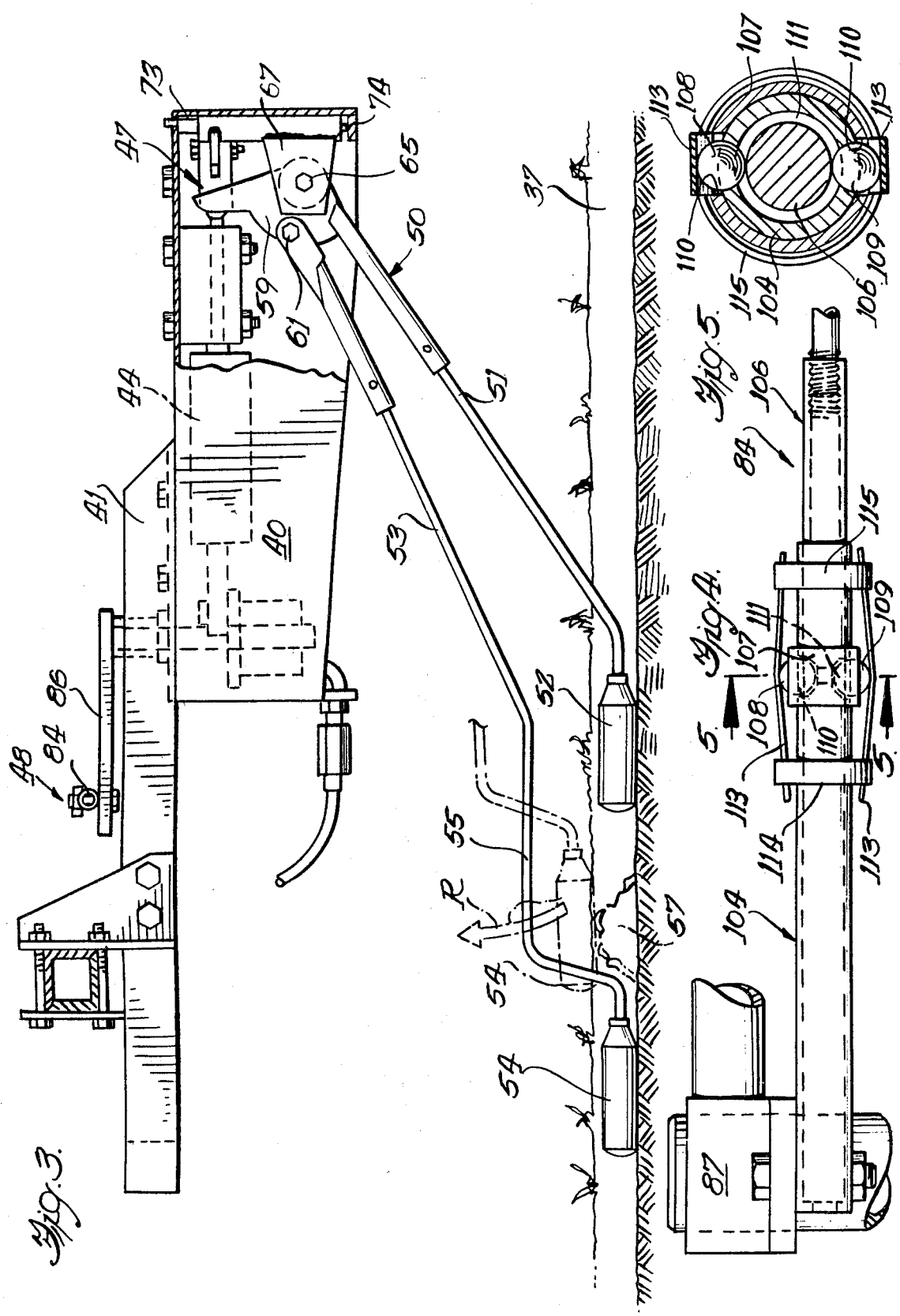

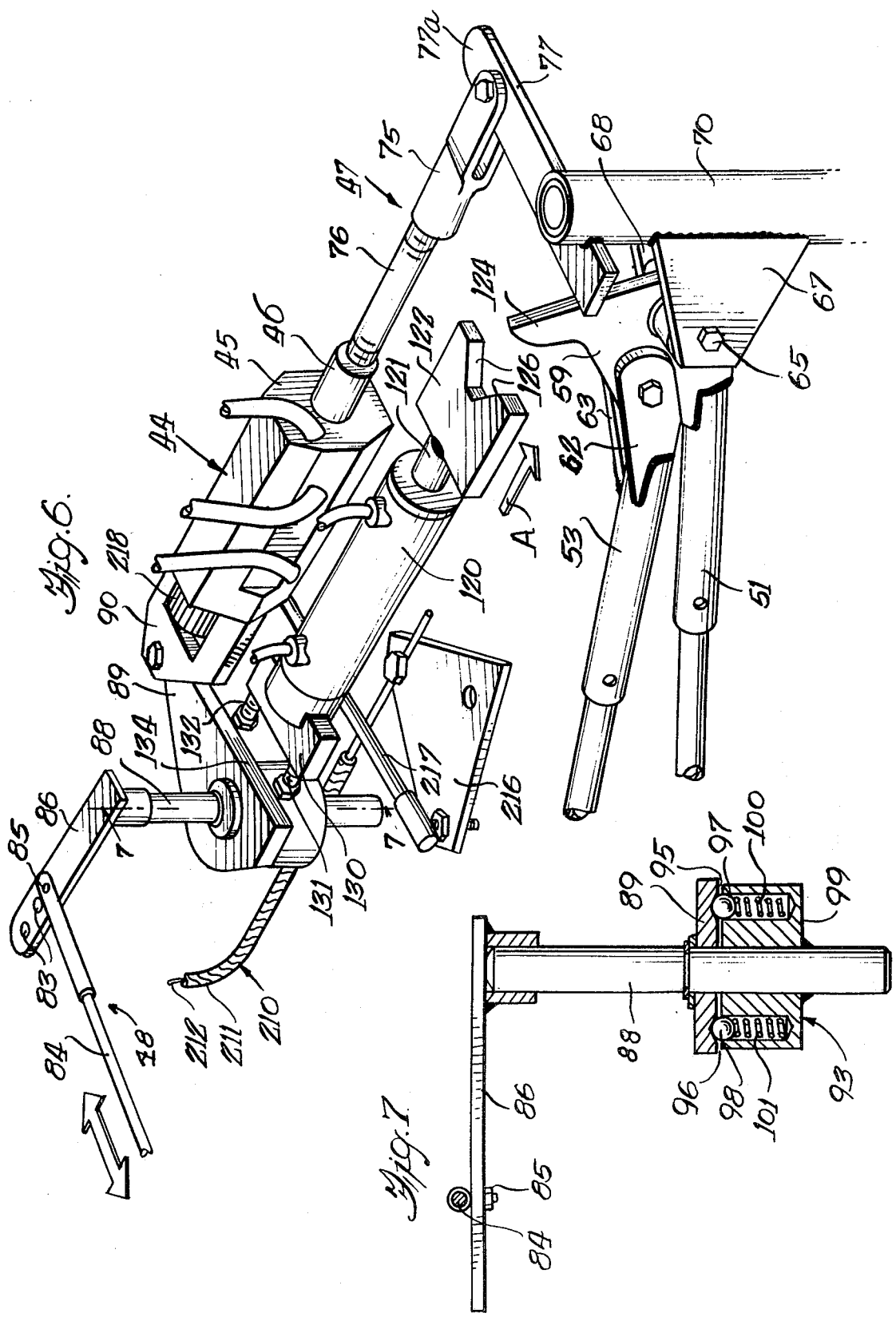

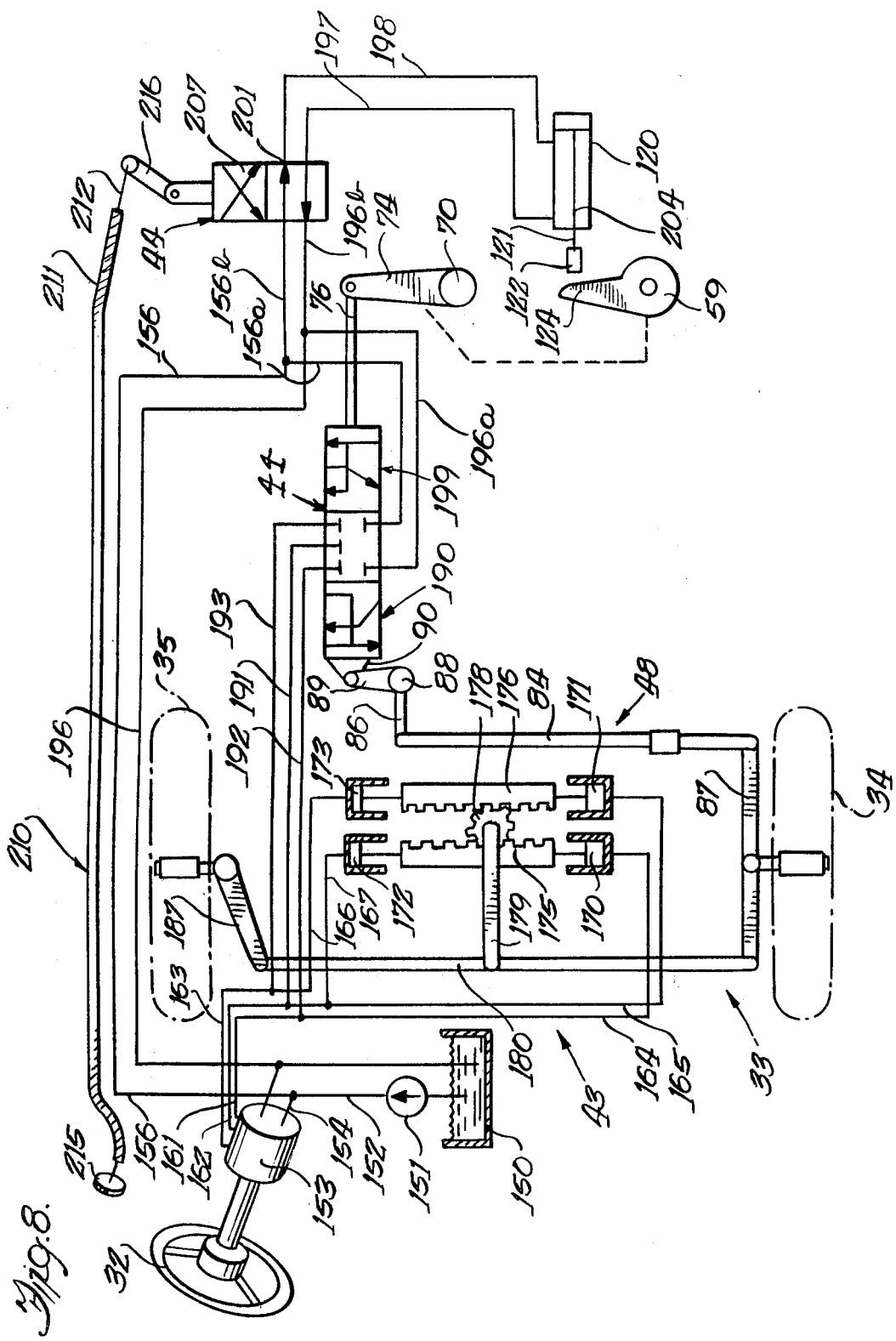

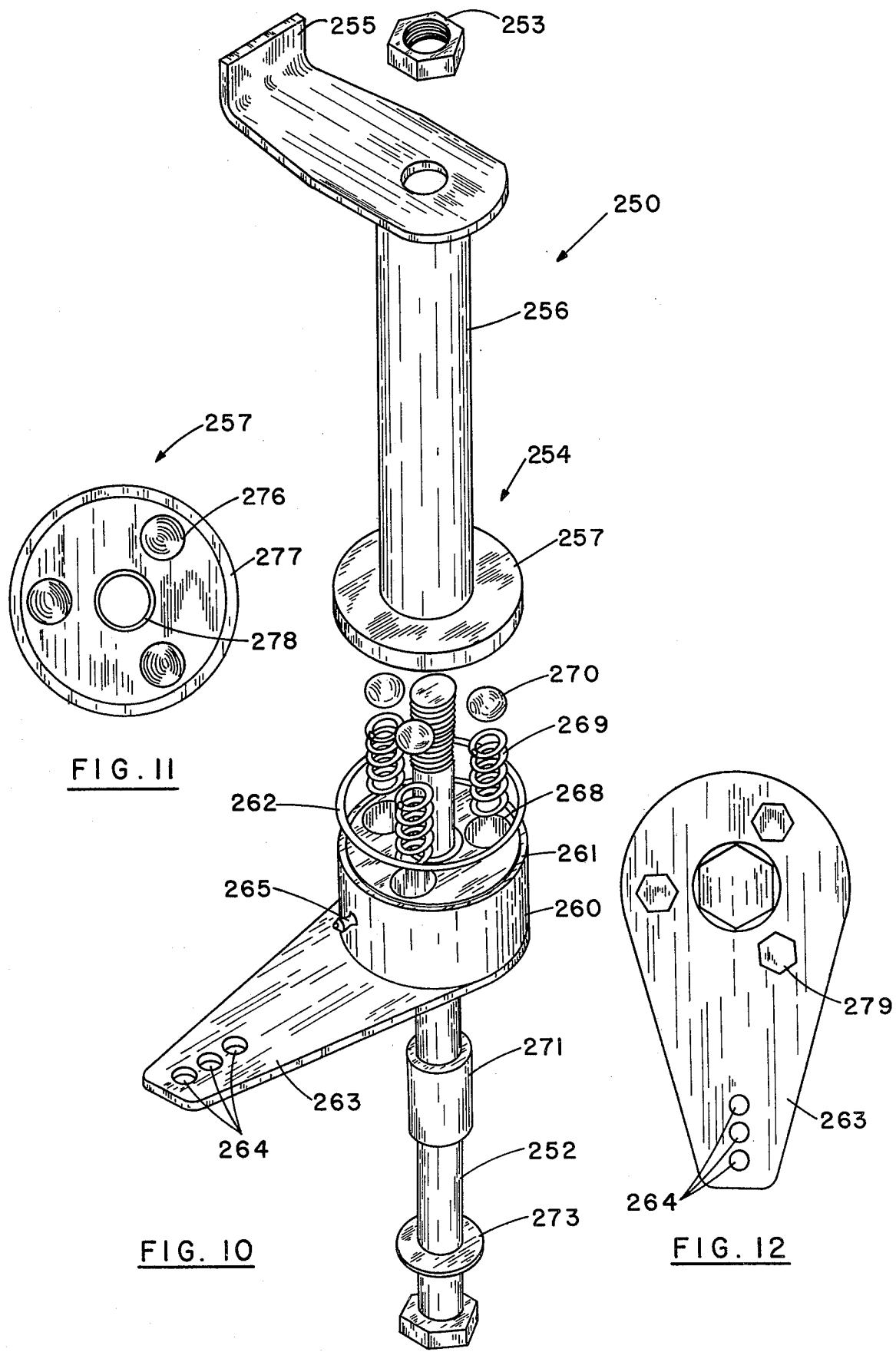

AUTOMATIC GUIDANCE MECHANISM STEERING CLUTCH

This application is a continuation-in-part of Ser. No. 039,224, filed Mar. 21, 1977, now abandoned.

BACKGROUND OF THE INVENTION

This invention relates generally to automatic controls for prime mover steering systems, and more particularly concerns an automatic steering system for a device such as a farm tractor.

In operating a prime mover such as a farm tractor in a field, the operator faces the tedious and tiring task of accurately guiding the prime mover and any pulled or operated implements with great precision along a predetermined path. For example, in plowing it is necessary to steer the pulling farm tractor so that evenly spaced furrows are created adjacent those furrows created in the last plow pass. The careful attention of the plowman is required in steering the tractor, yet he must also attend to adjusting tractor speed, plow depth and other variables.

To reduce this burden on the prime mover operator, a number of automatic steering devices have been offered to assist in tractor steering or to take over these steering jobs entirely. Until the present time, however, these devices have been more numerous than successful, and it is still the common practice to use manual steering methods to steer farm tractors while plowing, seeding, cultivating or otherwise treating field crops. It has been a major problem with automatic steering devices to date that once the automatic steering device is put into operation there is no means to manually override the automatic device with the conventional steering mechanism.

It is accordingly a general object of the present invention to provide a commercially attractive automatic steering mechanism for a prime mover such as a farm tractor.

An object of the present invention is to provide an automatic steering device which may be manually overridden by conventional steering apparatus.

Another object of the present invention is to provide a clutch mechanism for the above identified type of automatic steering device which holds a conventional steering mechanism in engagement with an automatic steering mechanism during small displacements of the conventional steering mechanism such as when the automatic steering device is effectively operative; and the clutch mechanism is operative to disengage the conventional steering mechanism when large displacements of the conventional steering mechanism occur for the purposes of preventing damage to the automatic steering mechanism and allowing an operator to override the automatic steering mechanism with the conventional steering mechanism when necessary.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing a portion of a preferred embodiment of the invention as it appears when in use with a prime mover such as a farm tractor following a furrow or like trench;

FIG. 2 is a top fragmentary view of the invention embodiment shown in FIG. 1;

FIG. 3 is a fragmentary side elevational view of the invention embodiment shown in FIGS. 1 and 2;

FIG. 4 is a fragmentary side elevational view of a steering gear connector arm compensator used with the invention;

FIG. 5 is a sectional view taken substantially in the plane of line 5—5 in FIG. 4;

FIG. 6 is a perspective view showing further detail portions of the furrow follower, guidance valve, lift cylinder and associated mechanisms carried by a housing;

FIG. 7 is a fragmentary sectional view taken substantially in the plane of line 7—7 in FIG. 6;

FIG. 8 is a schematic diagram of a hydraulic circuit including portions of the invention;

FIG. 10 is an exploded perspective view showing details of a steering clutch assembly.

FIG. 11 is a detail bottom view of a steering clutch assembly plate.

FIG. 12 is a detail bottom view of a steering clutch assembly clutch block.

DESCRIPTION OF THE PREFERRED EMBODIMENTS

Figure 9:
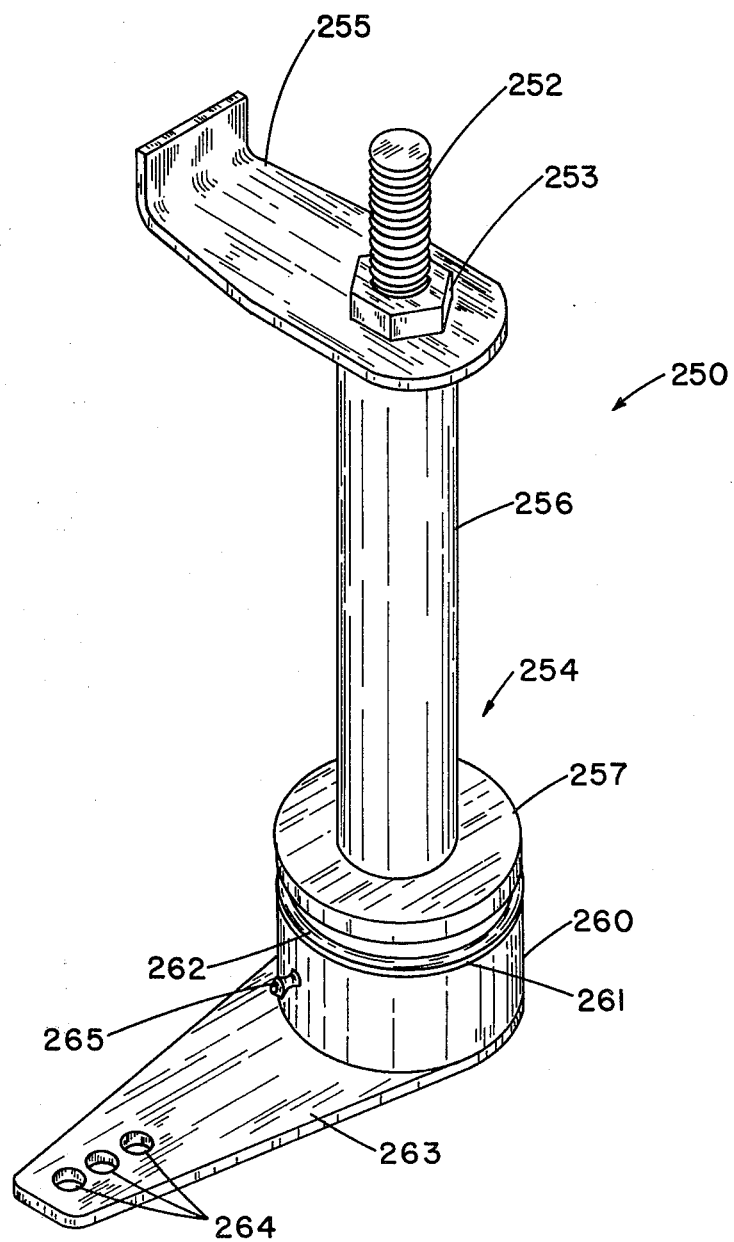
FIG. 9 is a perspective view showing details of a steering clutch assembly.

While the invention will be described in connection with a preferred embodiment, it will be understood that it is not intended to limit the invention to this embodiment. This application is intended to cover all alternatives, modifications and equivalents as may be included within the spirit and scope of the invention as defined by the appended claims.

GENERAL ARRANGEMENT

Turning first to FIG. 1, there is shown a prime mover 30 such as an ordinary large farm tractor as it may appear when traversing a field 31. As is well known, a tractor operator (not shown) can, by turning a steering wheel 32, manipulate steering gear 33 to turn tractor front wheels 34 and 35 either left or right so as to steer the tractor 30 a desired direction. When plowing, planting or tending row crops, this path of travel is usually that necessary to follow a predetermined path such as a trench or furrow 37 previously formed in the field 31. Power can be delivered by a prime mover engine 38 to rear wheels 39 so as to move the prime mover 30 over the field and pull a plow (not shown) or other suitable field working implement.

To cause the prime mover 30 to follow the path or furrow 37, an automatic steering mechanism is provided. Here, portions of this automatic steering mechanism are located in a box housing 40 which is appropriately mounted, as by angle irons 41 or other convenient structure, forwardly of the prime mover front wheels 34 and 35.

It is contemplated that this prime mover 30 is provided with a fluid power steering system 43 hydraulic curcuit (partially diagrammed in FIG. 8) controlled by the steering wheel 32. In accordance wth the invention, automatic steering is caused by a guidance valve 44 comprising a valve body member 45 and a spool member 46 (FIG. 6). In order that the valve 44 can steer the tractor 30 properly, one valve member (here the valve spool 46) is movably connected by a first linking assembly 47 to a predetermined path sensor which can be a furrow follower mechanism 50. Another valve member (here, the body 45) is movably connected to the steering gear 33 by a second linking assembly 48. As the linking assemblies 47 and 48 are moved by the path sensor or furrow follower 50 and the steering gear 33 respectively, the valve spool 46 and body 45 are positioned and re-positioned relative to one another to automatically cause steering action in the hydraulic circuit 43. Over-controlling is thus avoided.

Furrow Follower and First Linkage

To provide an indication of the direction of travel of the furrow 37 to the remaining portions of the automatic steering mechanism and the prime mover 30, a path sensing device such as a furrow follower mechanism 50 is carried partly in the housing 40 in a position to operate portions of the guidance valve 44 as illustrated in FIG. 3. Pursuant to the invention, the furrow follower 50 includes a first arm 51 terminating at a free end in a first probe 52 adapted for location in the furrow 37. A second arm 53 is carried vertically above the first arm 51 and terminates at its free end in a second probe 54. By providing an appropriate relief bend 55 in the second arm 53, the first and second probes 52 and 54 respectively can be carried one behind the other in a trail position configuration. During operation, when one of the probes encounter obstruction such as a clod 57 which may be accidentally deposited in the bottom of the trench 37, that probe (here, the second probe 54) simply rises in a vertical plane as illustrated by the arrow R and, after passing the obstruction 57, returns to its normal position in the furrow 37. No false turn requirement indication is transmitted to the remaining portions of the automatic steering system. Moreover, because the other probe (here, the first probe 52), is located at a spaced apart position in the furrow 37, that other probe 52 does not encounter the obstruction 57 at the same time as the probe 54 under consideration. Thus, accurate directional sensing indications are transmitted by the probes 52 and 54 to the remaining portions of the automatic steering mechanisms.

As illustrated in FIGS. 3 and 6, these arms 51 and 53 and the carried probes 52 and 54 are pivotally mounted for motion in the vertical plane so as to follow the furrow 37 upon a probe drag plate 59. In the illustrated embodiment, the second arm 53 is pivoted on the probe drag plate 59 as by a bolt 61 loosely fitted through second arm ears 62 and 63 and an aperture (not shown) in the probe drag plate 59 itself. To permit the probe arms to be raised from their operative positions shown in FIG. 3 to inoperative positions as will be explained later, the first arm 50 is fixed, by weldments or other known devices, to the probe drag plate 59. When the plate 59 and first arm 51 are lifted, the first arm 51 engages the underside of the second arm 53, and both arms 51 and 53 are thereafter raised together.

As the tractor is powered across the field 31 and over the furrow 37 by its engine 38, any tendency for the tractor to wander away from its designated position over the furrow 37 will cause the probes 52 and 54 and the attachment arms 51 and 53 to be angularly displaced in the horizontal plane of the field 31. Alternatively, if the furrow 37 is formed so as to veer off in a curving right-hand or left-hand direction, the probes, on encountering this change of furrow direction, will again similarly be angularly offset in the horizontal plane.

This angular offsetting motion will be transmitted from the probes 52 and 54 through the arms 51 and 53 to the probe drag plate 59. To permit the drag plate 59 to swing horizontally, the plate is journaled, as by a bolt 65, upon two ears 67 and 68 which are affixed, as by weldments or other known means, to a pivot post 70. This post 70 is here journaled upon the housing 40 by oppositely disposed bearings 73 and 74 (FIG. 3).

As the post 70 pivots, this motion is transmitted by the first linkage 47 to the guidance valve 44. Here, as shown in FIG. 6, this linkage 47 comprises a furrow follower lever 77, an offset swivel connection 75 and a connector extension 76 fixed to the guidance valve 44.

If desired, this pivoting motion can be limited by a lever arm extension 77a which extends through a slot 78 formed in the housing 40. The end points 79 of this slot 78 can be located to restrict rotational motion of the lever 77 and consequent rotational motion of the post 70 so as to avoid damage to the furrow follower 50, the linkage 47 or the valve 44 (FIG. 2).

Steering Gear and Second Linkage

A feedback linkage arm device 48 provides an indication to the guidance valve 44 of the position in which the steering gear 33 is located. More specifically, the valve body 45 will be located in any one of a range of positions by operation of the feedback linkage arm 48. Here, this feedback linkage arm means 48 includes a transversely oriented compensator arm 84 pivotally connected as by a bolt 85 to first displacement transfer arm 86. In carrying out the invention, greater or less indication of the steering gear displacement can be transmitted to the valve 44. To this end, the compensator arm 84 can be connected to the first displacement transfer arm 86 in any one of a number of positions, as designated by arm apertures 83. As indicated especially in FIGS. 1-3 and 8, the compensator arm 84 is connnected, in turn, to an extended steering knuckle link 87. As shown in FIGS. 6 and 8, motion of this link 87, the compensator arm 84 and the first displacement transfer arm 86 rotate a steering linkage shaft 88 and an affixed steering linkage plate 89 to transmit motion to a second displacement transfer clevis 90 secured to the guidance valve body 45.

It is a feature of the invention that if the steering gear is greatly displaced from its straight-ahead position, no damage will be done to the guidance valve 44 and associated linkage mechanisms 47 and 48. For example, if the front wheels 34 and 35 shown in FIG. 1 are turned to those positions associated with a full right-hand steering lock, the feedback linkage arm 48 will be greatly displaced from its straight-ahead sensing position. This great displacement would require a large rotational displacement of the interlinking plate 89 and might consequently cause damage to the guidance valve 44. To avoid this, the collapsible compensator arm 84 offers telescoping action. As illustrated in FIG. 4, the arm 84 includes an outboard end assembly 104 connected, as shown in FIG. 8, to the steering knuckle link 87. An inboard end 106 fits partly within the outboard end 104 and is adapted to move into and out of that end 104 with a telescopic action. To carry the ends 104 and 106 in a normally locked, fixed-length inter-relationship, a collar 107 on the first end 104 carries a series of detent balls 108 and 109 located to engage a detent groove 111 formed in the second rod or inboard end 106. Detent balls 108 and 109 extend through holes 110 in member 104. The detent balls 108 and 109 are retained in their illustrated positions by leaf springs 113 which are, in turn, carried upon collars 114 and 115. Thus once a given point of steering gear displacement is reached, increasing steering gear angular displacement is simply dissipated in the arm 84 without further corresponding valve body movement. It may be desirable to provide a back-up system for the telescoping action of the compensator arm 84 to prevent damage to the guidance valve 44 in the event the compensator arm malfunctions. To this end, a detent bearing unit 93 can be associated with the shaft 88 (FIG. 7). Here, the plate 89 is provided with a plurality of detents 95,96 on the plate underside. Detent balls 97 and 98 are pressed into engagement with the plate 89 underside and the plate detents 95 and 96 as by springs 100 and 101, which are retained in a bearing unit clutch block 99. The clutch block 99 is rigidly affixed to the shaft 88, whereas, the plate 89 is journaled to the shaft 88 and may, therefore, be rotated with respect to the shaft 88 and clutch block 99. Under normal operating conditions, the pressure from the detent balls 97,98 are sufficient to cause the plate 89 to be retained in a fixed position with respect to the shaft 88. However, when a sufficiently large force is applied to the plate 89 through the rotational movement of the shaft 88, the frictional force of the detent balls 97,98 is overcome and the plate 89 will rotate with respect to the shaft 88, thereby dissipating the displacement from the feedback linkage arm assembly 48.

Figure 13:
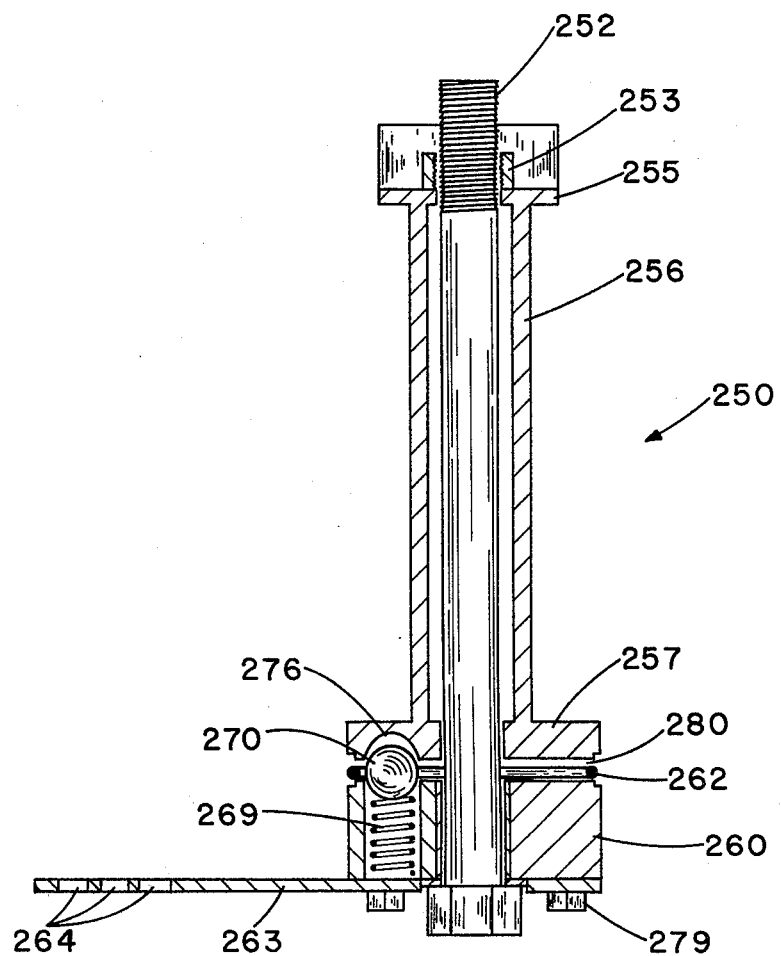
FIG. 13 is a cross sectional view showing a steering clutch assembly.
Figure 14:
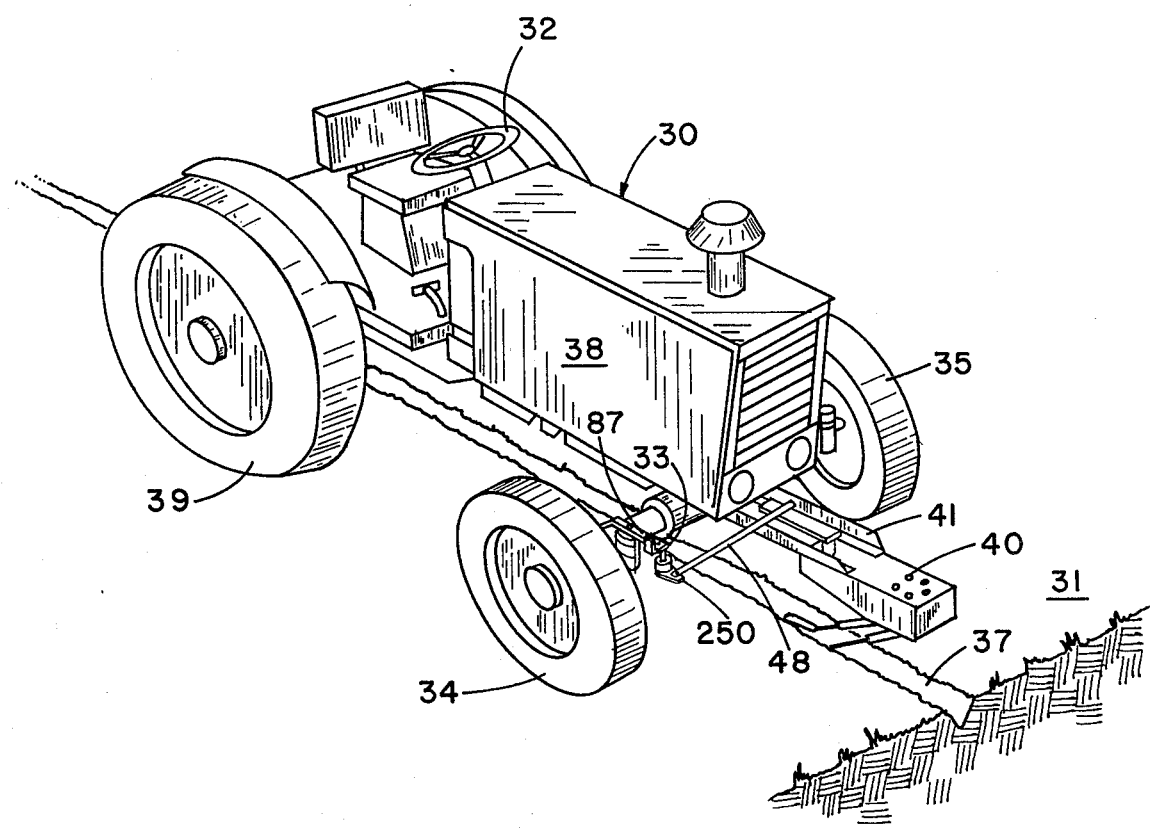
FIG. 14 is a perspective view showing a steering knuckle clutch assembly mounted on a prime mover.

In another embodiment of this invention, as shown in FIGS. 9-14, a steering knuckle clutch assembly 250 is mounted on the steering knuckle link 87. In this embodiment, as shown by FIG. 14, the feedback linkage arm assembly 48 is a fixed rod rather than a telescoping rod, although a telescoping rod could be used as a redundant clutch mechanism, as described above. As shown in FIG. 10, a cylindrical clutch block 260 is rotatably mounted on a threaded bolt 252 by means of a washer 273 and sleeve 271. Lubricant may be applied to the sleeve through a grease port 265. As shown in FIG. 12, a displacement transfer feedback linkage plate 263, with holes therein for accepting a feedback linkage arm assembly 48, is attached to the lower surface of the clutch block 260 by means of plate bolts 279. Three symmetrically spaced bores 268 are provided in the clutch block 260 to accomodate springs 269 and detent balls 270, as shown in FIGS. 10 and 13. A steering knuckle engagement unit 254 is also rotatably mounted on the threaded bolt 252, as shown in FIGS. 9,10 and 13. The steering knuckle engagement unit consists of a displacement transfer locking tab 255 rigidly affixed to the top of a tubular member 256, which is in turn rigidly mounted on a clutch plate 257. As shown by FIGS. 11 and 13, three circular indentations 276 are provided in the lower surface of the clutch plate 257 to accept somewhat less than a hemispherical portion of each detent ball 270. FIGS. 9 and 13 show that the clutch plate 257 and clutch block may be urged into near-touching position by pressure exerted by a nut 253 on the displacement transfer locking tab 255. The detent balls 270 are urged against the lower surface of the clutch plate 257 by springs 269 and when the clutch plate 257 and clutch block 260 are in proper angular alignment, the balls 270 are urged into the indentations 276. Thus, it may be seen that the detent balls 270 and circular indentations 276 co-act to prevent angular displacement of the steering knuckle engagement unit 254 with respect to the clutch block 260. Once the detent balls 270 are seated in the indentations 276, the engagement unit 254 will transmit torque and angular motion to the clutch block 260. However, if the torque becomes sufficient to overcome the force applied by the springs 269, the detent balls 270 will be depressed into the bores 268 and the engagement unit 254 and clutch block 260 will move independently until the balls 270 have reseated.

As shown in FIG. 14, the clutch assembly may be attached to the steering knuckle link 87 by means of the threaded bolt 252 and nut 253 and the displacement transfer locking tab 255. The second linking assembly 48 connects the clutch block arm 263 to the guidance valve 44. Thus, it may be seen that small displacements associated with ordinary guidance tracking will be transmitted from the steering gear 33 through the clutch assembly 250 to the guidance valve 44. However, large displacements which might be caused by manual steering to avoid an obstacle or to turn the prime mover at the end of a field, will cause the clutch assembly 250 to disengage, thereby preventing damage to the valve 44. Once the front wheels have assumed a relatively straight-ahead alignment, the detent balls 270 will reseat and the clutch 250 will be re-engaged.

Furrow Follower Lift and Valve Positioning

It is another feature of the invention that the furrow follower mechanism 50 and its probes 52 and 54 can be lifted from the operative lowered position shown in FIG. 3 to an inoperative raised position for vehicle over-road travel or the like. Moreover, the actuated lifting mechanism positions the first and second linking assemblies 47 and 48 and the associated valve body 45 and spool 46 in their respective straight-ahead positions when the furrow follower 50 is raised. When the valve members are so positioned, they do not affect the fluid power circuit 43 or interfere with normal steering actions accomplished with the steering wheel 32. To these ends, a furrow follower deployment device such as a lift cylinder 120 is carried in the housing 40 as illustrated in FIGS. 2 and 6. When the lift cylinder 120 is activated, it extends a cylinder rod 121 carrying a fork 122 for motion in the direction of the arrow A. This fork 122 engages an ear 124 extending from the main portion of the probe drag plate 59.

To center the forrow follower mechanism 50 and linked valve spool 46, this fork 122 is formed with a V-shaped ear engagement edge 126. As can be invisioned from FIG. 6, full extension of the lift cylinder rod 121 causes the fork 122 and its leading edge 126 to engage the probe drag plate ear 124 and rotate the drag plate 59 in the horizontal plate into a straight-ahead position. Drag plate rotation will, of course, also rotate the follower arms 51 and 53 into a straight-ahead position, and will cause the linkage post 70, swivel connection 75 and valve spool 46 to be respectively turned or pulled into their straight-ahead positions.

Deployment lift cylinder 120 actuation, likewise, locks the second linking assembly 48 into a straight-ahead travel position. To this end, a bridge plate 130 is affixed, as by welding or other convenient means, to the blind end of the lift cylinder 120. Adjustable fingers 131 and 132, which may take the form of machine bolts threaded into the bridge plate 130, are adapted to engage an adjacent edge 134 of the plate 89 and to rotate and lock that plate 89 and the shaft 88 into a steering-gear-straight-ahead position. When the plate 89 is located in a straight-ahead indicating position, the clevis 90 to which the plate 89 is secured is also positioned in a straight-ahead position, and this motion pulls the valve body 45, as well, into the straight-ahead position. Thus, both the valve body 45 and the valve spool 46 are located in the prime mover straight-ahead-travel positions.

It should be noted, however, that locating the first linking assembly 47, the second linking assembly means 48 and the valve members 45 and 46 in their respective straight-ahead positions does not necessarily mean that the prime mover must be directed along a straight-ahead, linear path of travel. To the contrary, appropriate operator manipulation of the steering wheel 32 shown in FIG. 1 continues to provide appropriate steering motion to the steering gear 33 and to the front wheels 34 and 35. As the steering gear motion occurs, the motion is simply lost in the second linking assembly 48 within the compensator arm 84 by telescoping action between the arm ends 104 and 106 as described above before damaging forces are imposed upon the valve body 45.

We claim:

1. In an automatic steering mechanism for a prime mover of a type having a mechanical linkage means connected between a conventional steering mechanism and an automatic steering unit said mechanical linkage means being for transmitting displacement feedback force from the conventional steering mechanism to the automatic steering unit, an oversteering displacement absorber including clutch means for selectively disengaging said mechanical linkage from said automatic steering unit, said clutch means including means for automatically disengaging said mechanical linkage means from said automatic steering unit at a preselected value of said feedback force and said clutch means further comprising:
   (a) a shaft;
   (b) clutch block means operably mounted on said shaft;
   (c) clutch plate means operably mounted on said shaft and selectively rotatable with respect to said clutch block;
   (d) engagement means for selectively engaging and disengaging said clutch block with said clutch plate;
   (e) first displacement transfer means operably connected to said clutch block means;
   (f) second displacement transfer means operably connected to said clutch plate means.

2. The oversteering displacement absorber of claim 1 wherein said engagement means comprises:
   (a) spring biasing means mounted within said clutch block;
   (b) detent balls operably positioned on said spring biasing means; and
   (c) detent grooves on said clutch plate adapted to accept said detent balls.

3. The oversteering displacement absorber of claim 2 wherein said first displacement transfer means is operably connected to said conventional steering mechanism and said second displacement transfer means is operably connected to said automatic steering unit.

4. The oversteering displacement absorber in claim 3 wherein said clutch block means is fixedly mounted on said shaft and werein said clutch plate means is journaled to said shaft proximate said clutch block.

5. The oversteering displacement absorber of claim 2 wherein said first displacement transfer means is operably connected to said automatic steering unit and said second displacement transfer means is operably connected to said conventional steering mechanism.

6. The oversteering displacement absorber of claim 5 wherein said prime mover has a steering knuckle and wherein said first displacement transfer means comprises a clutch block arm fixedly mounted on said clutch block and pivotally attached to a feedback linkage arm, and wherein said second displacement transfer means comprises a locking tab fixedly mounted on said clutch plate and fixedly positioned on said steering knuckle.

* * * * *